United States Patent [19]

Wallace et al.

[11] 4,406,369

[45] Sep. 27, 1983

[54] TAPE CASSETTE HOLDER

[75] Inventors: Robert S. Wallace, Los Angeles; Arlington R. Robbins, La Mesa, both of Calif.

[73] Assignee: Unique Designs, a general partnership, Los Angeles, Calif.

[21] Appl. No.: 170,831

[22] Filed: Jul. 21, 1980

[51] Int. Cl.³ .............................................. B65D 85/67
[52] U.S. Cl. .................................................... 206/387
[58] Field of Search ................ 206/387, 461, 472, 493

[56] References Cited

U.S. PATENT DOCUMENTS

| 3,664,492 | 5/1972 | Wallace | 206/387 |
|---|---|---|---|
| 3,994,551 | 11/1976 | Ackeret | 206/387 |
| 4,022,322 | 5/1977 | Louzil | 206/387 |
| 4,030,601 | 6/1977 | Ackeret | 206/387 |
| 4,140,219 | 2/1979 | Somers | 206/387 |
| 4,253,567 | 3/1981 | Goldammer | 206/387 |
| 4,285,554 | 8/1981 | Bell et al. | 206/387 |
| 4,287,989 | 9/1981 | Plummer | 206/387 |

Primary Examiner—Joseph Man-Fu Moy
Attorney, Agent, or Firm—William W. Haefliger

[57] ABSTRACT

Apparatus for receiving a tape cassette includes a sleeve, at least one flexible arm on the sleeve top wall, and a projection carried by each arm to cam against the cassette and to drop into a cassette reel opening to block rotation of the reel.

22 Claims, 10 Drawing Figures

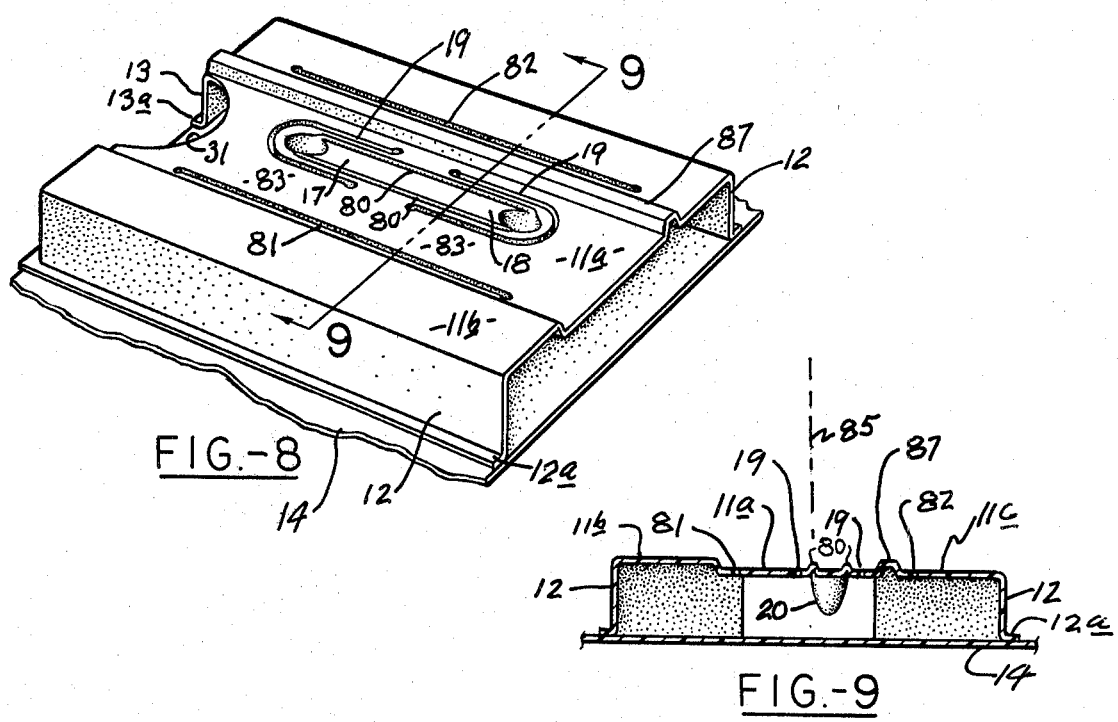
FIG.-8
FIG.-9
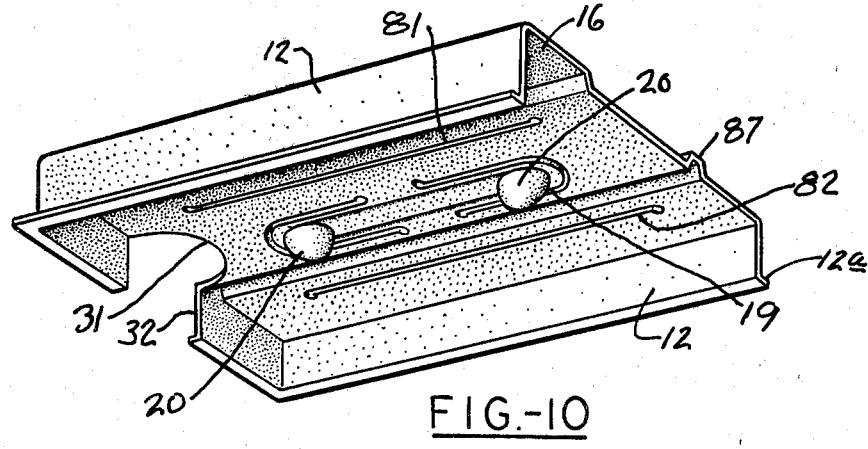
FIG.-10

TAPE CASSETTE HOLDER

BACKGROUND OF THE INVENTION

This invention relates generally to tape cassette containers, and more particularly concerns the simplification of such containers to enable quick loading of cassettes into the containers and removal of cassettes therefrom, and to reduce the expense of manufacture and handling of such containers.

The production and distribution of cassettes, as for example magnetic tape cassettes, has increased markedly over recent years. These devices comprise containers for reels and magnetic tape wound thereon, enabling rapid insertion of the cassettes into recording or play back equipment, eliminating direct handling of the tape by the user. Since the reels are "floating" in many such cassettes, it becomes necessary to block their free rotation when the cassettes are handled outside the recorder, to prevent inadvertent unwinding of the tape in response to unwanted rotation of the floating reels. In the past, cassette boxes have been used for this purpose; however, known boxes or containers are constructed with receptacles and lids therefor, necessitating removal of the lid to gain access to the receptacle interior for insertion or withdrawal of the cassette. Thereafter, the lid must be re-applied to the receptacle, and it frequently happens that the lid inadvertently comes loose, resulting in spilling of the cassette from the container and unwinding of the narrow tape from the reels, destroying the usefulness of the cassette.

U.S. Pat. No. 3,664,492 discloses a unique solution to the above problems.

SUMMARY OF THE INVENTION

It is a major object of the present invention to provide additional unique solutions to the above problems, and affording a number of advantages over the device disclosed in U.S. Pat. No. 3,664,492. Basically, the invention is embodied in:

(a) a sleeve having a top wall and opposite side walls, the sleeve having an open end to receive insertion of the cassette case relatively into the sleeve interior below said top wall, (b) the top wall having a flexible portion (or portions) and slitting in that wall adjacent the flexible wall portion;

(c) a projection carried by the flexible portion and extending downwardly into the sleeve interior, that projection having at least one cam surface to be engageable with the cassette case in response to such case insertion, whereby the projection is deflected upwardly by the case as accommodated by flexing of the flexible portion, and the projection rides on the case and ultimately is urged into the reel opening to block rotation of the reel.

As will appear, one or more of such flexible portions in the form of arms may be associated with the top wall of the sleeve, each arm advantageously comprising, for example, a tab extending generally in the plane of the top wall; openings in the top wall register with such tabular arms, with peripheral slots formed between the tabular arms and the wall; the projection or projections may be substantially inflexible so as to have effective cam relation with the cassette case, the arms allowing up and down displacement of the projections while they remain directed downwardly toward the cassette and the reel or reels therein; the arms may extend parallel to or at right angles to the direction of cassette insertion and withdrawal; the sleeve side wall may be bonded to a backer sheet and multiple of such sleeves may be so mounted on a common backer sheet; the sleeve may be sized to receive multiple cassettes in side-by-side relation to provide a very compact assembly; and the units may be racked in parallel relation for compact storage. Also, the top wall may be slitted to eliminate the arms.

These and other objects and advantages of the invention, as well as the details of an illustrative embodiment, will be more fully understood from the following description and drawings, in which:

DRAWING DESCRIPTION

FIG. 8 is a top perspective view like FIG. 1, but showing a further modified sleeve;

FIG. 9 is a vertical section on lines 9—9 of FIG. 1; and

FIG. 10 is a perspective view of the FIG. 8 sleeve, but looking upwardly into the interior.

DETAILED DESCRIPTION

Figures 1, 2:
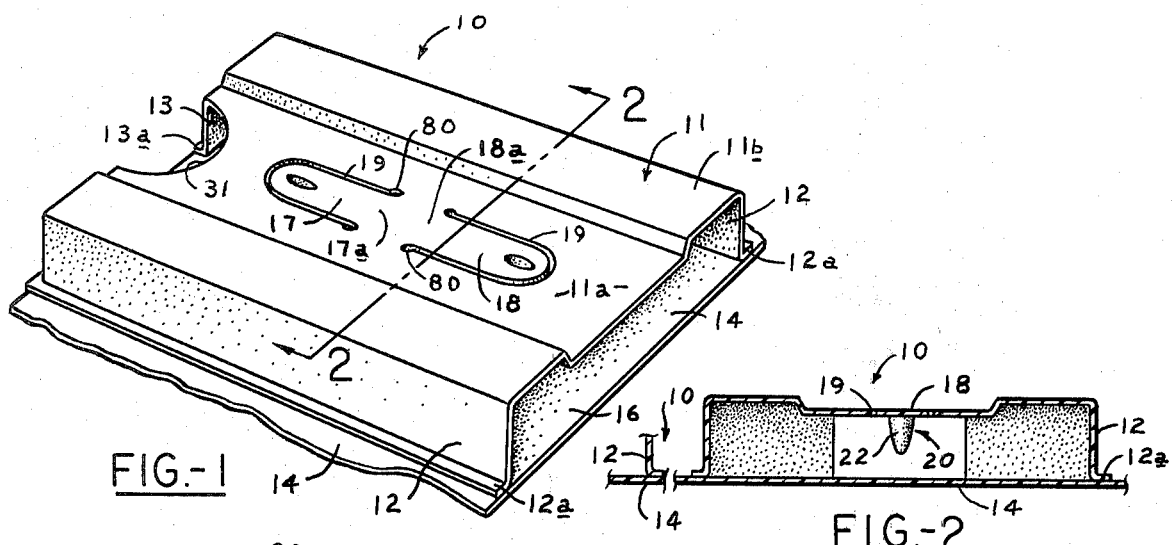
FIG. 1 is a top perspective view of a cassette or cartridge holder sleeve embodying the invention, looking down on the holder.
FIG. 2 is a section on lines 2—2 of FIG. 1.

The sleeve or pocket 10 shown in FIGS. 1-5 has top wall 11 and opposite side walls 12 extending in generally parallel relation, normal to the plane of top wall 11. An end wall 13 is also shown. The lower edge portion of walls 12 and 13 may be turned outwardly, as shown, to provide flanges 12a and 13a attachable as by bonding to a mounting sheet 14, whereby one or several sleeves may be mounted on the sheet 14, in selected positions. Multiple sheets 14 may be connected together, to form an album.

Figure 4:
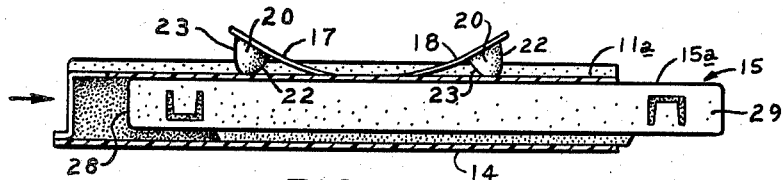
FIG. 4 is a vertical section on lines 4—4 of FIG. 3.
Figures 3, 5:
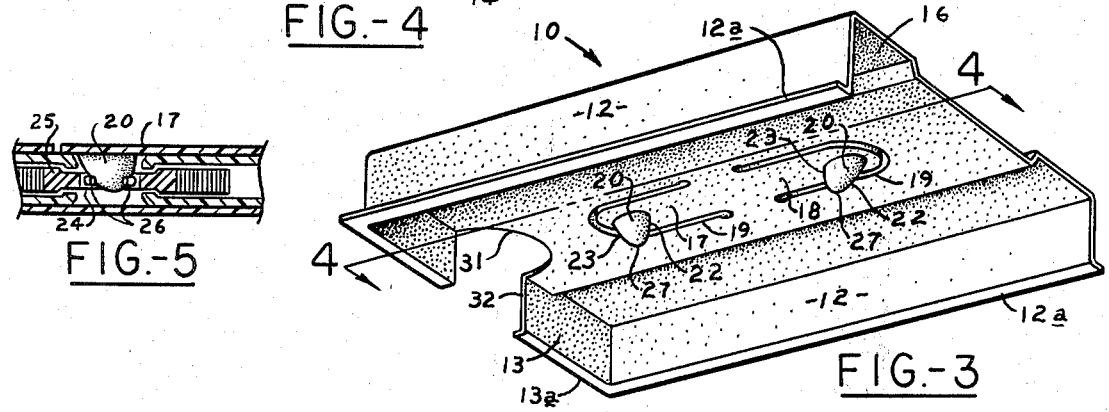
FIG. 3 is a perspective view of the FIG. 1 holder, looking upwardly into the interior.
FIG. 5 is a fragmentary view showing a retainer urged downwardly into a cassette reel.

The sleeve is sized to closely receive endwise insertion of a cassette case. Thus, the cassette 15 may be freely inserted in the sleeve or pocket open end 16. FIG. 4 shows the cassette being displaced endwise in the sleeve, but in withdrawal mode. When fully inserted, the cassette is retained in the sleeve, as shown in FIG. 5, for example.

With regard to such retention, at least one, and preferably two resiliently flexible arms are carried by the sleeve to extend generally in the direction of the top wall, each arm connected at one end thereof to that wall. See for example the arms 17 and 18 in the form of tabs which extend generally in the plane of the top wall 11, in unflexed condition, as in FIGS. 1-3. As there shown, the arms comprise tab portions of the top wall, there being narrow slots 19 peripherally separating such tab portions from the remainder of the top wall except at the loci of tab portion connection to the top wall, as at 17a and 18a. Such slots may be generally U-shaped, as shown, and have enlarged ends 80. In FIGS. 1-4, the tab portions 17–18 extend lengthwise in the direction of endwise insertion and withdrawal of the cassette, relative to the sleeve, and define "spring boards."

A projection 20 is also carried by each arm to extend downwardly into the sleeve interior 21, the fin-like projection typically being relatively rigid so as to provide at least one cam surface, and preferably two such end surfaces 22 and 23 angled to have cam engagement with the cassette case in response to case relative movement in the sleeve. The construction is such that the cam-like projection is deflected upwardly by the case as accommodated by flexing of the arm, and the projection rides on the case to ultimately register with an opening 24 in a tape winding reel 25. In this regard, a cassette may have two such reels, which are annular and have driver shoulder structure, as for example spokes 26 proximate and projecting in the openings 24. See FIG. 5, with the projection urged downwardly into the opening 24, and between spokes 26 by unflexing of the tabular arm 17.

The projection 20 typically is generally U-shaped, the surfaces 22 and 23 merging at a lower downwardly convex tip 27. Surfaces 22 and 23 may define rounded edges which are spaced apart in longitudinal direction of cassette insertion and withdrawal. Edge 22 is angled to be cammed upwardly by the cassette case end 28 as the cassette is inserted; and edge 23 is angled to be cammed upwardly by the reel bordering opening 24, as the cassette is withdrawn. Note that in FIGS. 1–3, arms 17 and 18 extend endwise oppositely in the longitudinal direction of cassette insertion and withdrawal. The projections are located to drop into the two reels, respectively, of the cassette as the cassette reaches fully inserted position in the sleeve, the projections always projecting downwardly during their movement.

Note the central cut-out 31 in the end of the top wall 11, and merging with cut-out 32 in end wall 13. Such cut-outs enable application of finger pressure to displace the fully inserted cassette in the withdrawal direction, so that end 29 may be grasped for completing such withdrawal. See FIGS. 1 and 4, in this regard.

Wall 11 may be stepped at 11a, and lengthwise of the sleeve, to closely hug the cassette top surface 15a, while the thicker portions of the cassette may fit closely the sleeve top wall extents 11b, which are raised.

The sleeve may have one-piece plastic construction, molded, extruded or die stamped.

Multiple of the sleeves or pockets may be attached to the same backer sleeve, as appears in FIG. 2.

Figure 6:
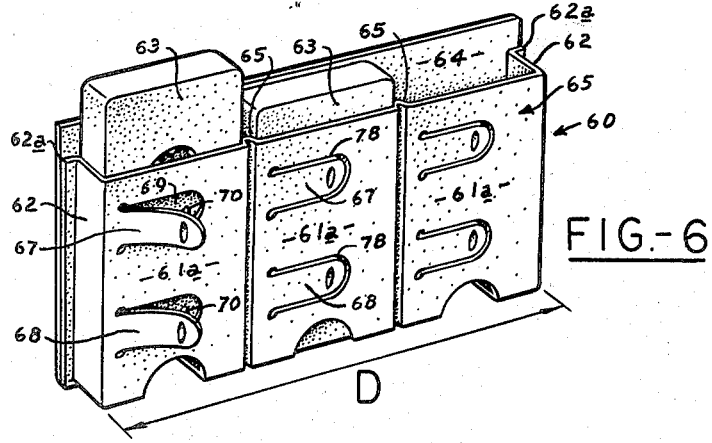
FIG. 6 is a perspective view of a modified holder sleeve embodying the invention.

In FIG. 6, the modified sleeve 60 has a front or top wall 61, and opposite parallel side walls 62. The latter are spaced apart by a distance D which exceeds the widths of at least two cassettes 63 received between said side walls, in side-by-side relation as shown. Accordingly, provision is made to receive multiple cassettes in one sleeve, for added compact packaging. Flanges 62a on side walls 62 are attached to common backer sheet 64. Separators 65 on or integral with the top wall extend parallel to side walls 62 and project into the sleeve interior to define portions of that exterior adapted to receive the respective cassettes, thereby maintained in slightly separated relation.

Longitudinally spaced, laterally extending flexible arms 67 and 68 are associated with each portion 61a of the top wall 61, each such portion overlying one cassette. The arms may be tabular, as in FIG. 1, with one end thereof integral with the wall portion 11a. Openings 69 through the wall portion register with the arms, and slots are defined between the arms and wall portions, as at 78. Projections 70 carried by the arms correspond to projections 20, except that they extend generally longitudinally, in the directions of cassette insertion and withdrawal, whereas the arms extend laterally. The two projections carried by arms 67 and 68 register with and drop into the cassette reel openings, as explained above in connection with FIG. 5.

Figure 7:
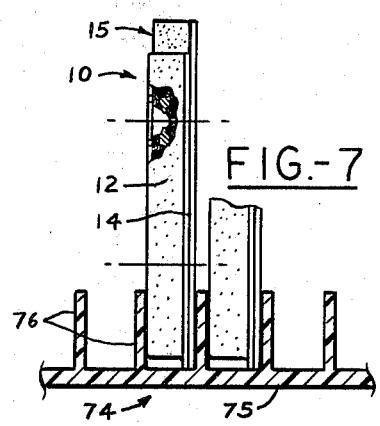
FIG. 7 is a fragmentary elevation showing rack storage of a unit embodying the invention, with cassette therein.

FIG. 7 shows a rack 78 having a bottom plate 75 and upright parallel dividers 76 spaced apart to receive units (as in FIG. 1 or FIG. 7) between the dividers 76. This accomplishes very compact storage of the units.

The modified sleeve shown in FIGS. 8–10 bears the same numbers as applied in FIGS. 1–3 to the extent the elements are the same. One difference is the inclusion of stiffening ribbing 80 on the arms 17 and 18, to further resist bending of such arms.

Also, slitting is provided at 81 and 82 in the top wall, whereby slots or slits 19 may be omitted, eliminating arms 17 and 18. In such event, the portion 83 of the top wall between the slits is made more flexible, allowing or facilitating up and down movement of the projections 20. Slits 81 and 82 extend longitudinally and at opposite lateral sides of both projections. If desired, one of the projections may be omitted, and the slits may extend laterally instead of longitudinally, or in other directions.

FIG. 9 shows the projections 20 laterally offset from a plane 85 bisecting the sleeve and parallel to walls 12. This allows the projections 20 to drop into the centers of the cassette hubs, the cassette always being inserted into the sleeve with its thickest portion under stepped portion 11b of the top wall. The opposite top wall portion 11c is not stepped, whereby a like sleeve may be inverted with its wall portion 11b seating at 11c, providing nesting stacking. Raised guide rib 87 facilitates such stacking and prevents lateral displacement of the stacked sleeves.

We claim:

1. Apparatus for receiving a tape cassette and for blocking a tape winding reel therein against rotation, the reel forming an opening exposed through the wall of the cassette case, comprising
    (a) a sleeve having a top wall and opposite elongated side walls, the sleeve having an open end to receive insertion of the cassette case relatively into the sleeve interior below said top wall,
    (b) the top wall having a flexible portion and slitting in said wall adjacent said flexible portion,
    (c) a projection carried by said flexible portion and extending downwardly into said sleeve interior, said projection having at least one cam surface to be engageable with the cassette case in response to said case insertion, whereby the projection is deflected upwardly by the case as accommodated by flexing of said portion and the projection rides on the case and ultimately is urged by said flexible portion into the reel opening to block rotation of the reel,
    (d) said side walls having integral flanges projecting freely generally parallel to a plane defined by said top wall, for flange attachment to a backer sheet, while accommodating flexing of said top wall toward and away from the sleeve interior,
    (e) said slitting in said top wall including at least one slit that is linearly elongated along major extent of the top wall and everywhere located at a substantial spacing from said projection, whereby major extent of said top wall is weakened and made flexible for movement with said projection toward and away from the sleeve interior.

2. The apparatus as defined by claim 1 wherein said projection is substantially inflexible.

3. The apparatus of claim 1 wherein said flexible portion comprises a tab which extends generally in the plane of the sleeve top wall in unflexed condition.

4. The apparatus of claim 1 wherein said flexible portion is in the form of an arm which comprises a tab portion of said top wall, said slitting including a second slit separating the arm from said top wall except at the locus of arm connection to said top wall.

5. The combination of claim 4 wherein said arm extends generally in the direction of insertion of the case into the sleeve.

6. The combination of claim 4 wherein said arm extends generally normal to the direction of insertion of the case into the sleeve.

7. The combination of claim 5 wherein the projection is generally U-shaped in a plane extending in said direction.

8. The combination of claim 6 wherein the projection is generally U-shaped in a plane extending in said direction.

9. The combination of claim 1 including a second flexible portion and projection as defined in (b) and (c) of claim 1, the second projection located to be urged into a second tape winding reel associated with the case.

10. The combination of claim 9 wherein both of said flexible portions extend as arms generally in the direction of insertion of the case into the sleeve.

11. The combination of claim 9 wherein both arms extend generally normal to the direction of insertion of the case into the sleeve.

12. The combination of any of claims 1, 10 and 11 including a backer sheet to which said side walls are attached, the sleeve also having an end wall which is medially interrupted, and flanges on said end wall attached to said sheet.

13. The combination of claim 12 including multiple of the sleeves as defined in claim 1, with associated flexible portions and projections, the side walls of said multiple sleeves attached to said backer.

14. The combination of any of claims 1, 12 and 13 including cassettes received in said sleeves, with said projections received in reels associated with said cassettes.

15. The combination of claim 1 wherein the sleeve has an end wall, there being merging cut-outs in said end wall and top wall.

16. The combination of claim 1 wherein said opposite side walls are spaced apart by a distance exceeding the widths of two cassettes, whereby multiple cassettes are receivable in said sleeve.

17. The combination of claim 16 wherein said top wall has multiple extents respectively adapted to overlie multiple cassettes, said flexible portions and projections associated with one of said top walls extents and there being other flexible portions and projections as defined in claim 1 but respectively associated with the remaining top wall extent or extents.

18. The combination of claim 17 including separators on said top wall and projecting into the sleeve interior to define portions of said interior adapted to receive the respective cassettes.

19. The combination of claim 4 including stiffening ribbing on said arm.

20. The combination of claim 1 wherein said projection is laterally offset from a plane bisecting said sleeve and generally parallel to said opposite side walls.

21. The combination of claim 20 wherein said top wall has a step at only one side of said plane, whereby a like sleeve may be inverted and stacked on said first mentioned sleeve with said top walls interengaged, said one slit located proximate said step.

22. The combination of claim 1 wherein said slitting includes another slit which, together with said one slit define two generally parallel slits at opposite sides of said projection and spaced therefrom.

* * * * *